United States Patent
Morgan

(10) Patent No.: US 7,722,491 B2
(45) Date of Patent: May 25, 2010

(54) POWER SHAFT INCLUDING A BELT RETAINING GEOMETRY

(75) Inventor: Charles Jeff Morgan, Long Beach, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 1401 days.

(21) Appl. No.: 10/716,687

(22) Filed: Nov. 19, 2003

(65) Prior Publication Data

US 2005/0107197 A1 May 19, 2005

(51) Int. Cl.
*F16H 55/32* (2006.01)
*F16H 55/50* (2006.01)
*F16H 7/02* (2006.01)

(52) U.S. Cl. .............. 474/166; 474/148; 474/167; 474/237

(58) Field of Classification Search ............. 474/69–71, 474/84–87, 152–156, 130, 148, 166–167, 474/237; 198/790, 781.1, 781.03
See application file for complete search history.

(56) References Cited

U.S. PATENT DOCUMENTS

| | | | |
|---|---|---|---|
| 2,183,258 A | 12/1939 | Harman | |
| 2,418,337 A * | 4/1947 | Davis | 474/130 |
| 3,122,935 A | 3/1964 | Morling | |
| 3,143,270 A * | 8/1964 | Cohen | 242/615.2 |
| 3,965,765 A | 6/1976 | Vaillette et al. | |
| 4,114,751 A * | 9/1978 | Nordin | 474/166 |
| 4,372,442 A * | 2/1983 | Fleischauer | 198/790 |
| 5,318,479 A * | 6/1994 | Lawroski | 474/130 |
| 5,649,617 A * | 7/1997 | Fortenbery et al. | 198/781.03 |
| 5,903,805 A | 5/1999 | Ueda et al. | |
| 6,638,192 B2 * | 10/2003 | Chen | 474/148 |
| 6,969,021 B1 * | 11/2005 | Nibarger | 242/346.2 |

* cited by examiner

Primary Examiner—Marcus Charles
(74) Attorney, Agent, or Firm—Winston & Strawn LLP

(57) ABSTRACT

A power shaft including a belt retaining geometry is provided according to an embodiment of the invention. The power shaft includes a shaft including a normal belt position portion adapted for receiving a belt and a reduced diameter portion formed on the shaft and located adjacent to the normal belt position portion. The belt can move into the reduced diameter portion of the power shaft during operation and the reduced diameter portion creates an alignment tension force on the belt that operates to return the belt to the normal belt position portion.

20 Claims, 5 Drawing Sheets

POWER SHAFT INCLUDING A BELT RETAINING GEOMETRY

TECHNICAL FIELD

The present invention relates to a power shaft, and more particularly, to a power shaft including a belt retaining geometry.

BACKGROUND OF THE INVENTION

Motors are widely used to power many devices and machines. The rotational power developed by a motor can be harnessed and directed by a belt. The belt can run in a pulley mounted on the shaft. Alternatively, the belt can run directly on the power shaft, wherein tension in the belt holds the belt in place on the power shaft.

One use of a motor is in a vacuum cleaner. A motor in a vacuum cleaner can power a driven device such as a vacuum fan unit, a powered brushroll, drive wheels, etc. However, the use of the vacuum cleaner in a dirty environment often leads to belt slippage. A motor-driven belt can slip due to excessive load on the driven device, for example. A powered brushroll can encounter an obstacle, such as a heavy carpet, that can slow or stall the brushroll, resulting in motor stall or belt slippage. Alternatively, a powered brushroll can accumulate fiber strands and other foreign objects that can slow or stall the brushroll. Another common belt slippage cause is the presence of lubricant or other foreign liquids on the belt. Yet another cause can be dirt, etc., between the belt and the shaft.

The slowing or stalling of a driven device can additionally cause the belt to move on the power shaft. Typically, the belt will move toward a side of higher belt tension. Therefore, if the belt is improperly aligned or improperly installed, the belt can move away from the desired running location on the power shaft. In severe cases, the belt can move completely off of the shaft. Another consequence is that the moving belt can contact a housing or wall structure next to the belt. For example, in a vacuum cleaner a power shaft and belt can be located in close proximity to an access door. If the belt moves on the power shaft, the resulting wearing action can damage both the belt and the vacuum cleaner structure.

One prior art approach has been to form a ridge or flange on the shaft to prevent moving of the belt. For example, a flange can be formed on the end of the shaft. However, this prior art approach does not prevent improper installation/alignment. This prior art approach does not move the belt to a desired alignment if the belt is improperly installed or aligned.

SUMMARY OF THE INVENTION

A power shaft including a belt retaining geometry is provided according to an embodiment of the invention. The power shaft comprises a shaft including a normal belt position portion adapted for receiving a belt and a reduced diameter portion formed on the shaft and located adjacent to the normal belt position portion. The belt can move into the reduced diameter portion of the power shaft during operation and the reduced diameter portion creates an alignment tension force on the belt that operates to return the belt to the normal belt position portion.

A power shaft including a belt retaining geometry is provided according to an embodiment of the invention. The power shaft comprises a shaft including a normal belt position portion adapted for receiving a belt, a first angled portion that angles from a normal diameter of the normal belt position portion inwardly partially toward a center of the shaft and tapers to a reduced diameter and at a first angle from an exterior surface of the shaft, a second angled portion that angles outwardly from the reduced diameter and at a second angle from the exterior surface of the shaft, a neck region formed between the first angled portion and the second angled portion, wherein the neck region transitions from the first angled portion to the second angled portion, and the belt positioned on the normal belt position portion of the shaft. The belt can move into the reduced diameter portion of the power shaft during operation and the reduced diameter portion creates an alignment tension force on the belt that operates to return the belt to the normal belt position portion.

A method of forming a power shaft including a belt retaining geometry is provided according to an embodiment of the invention. The method comprises providing a shaft portion including a normal belt position portion adapted for receiving a belt and forming a reduced diameter portion on the shaft and located adjacent to the normal belt position portion. The belt can move into the reduced diameter portion of the power shaft during operation and the reduced diameter portion creates an alignment tension force on the belt that operates to return the belt to the normal belt position portion.

BRIEF DESCRIPTION OF THE DRAWINGS

The same reference number represents the same element on all drawings. It should be noted that the drawings are not to scale.

DETAILED DESCRIPTION OF THE INVENTION

Figure 1:
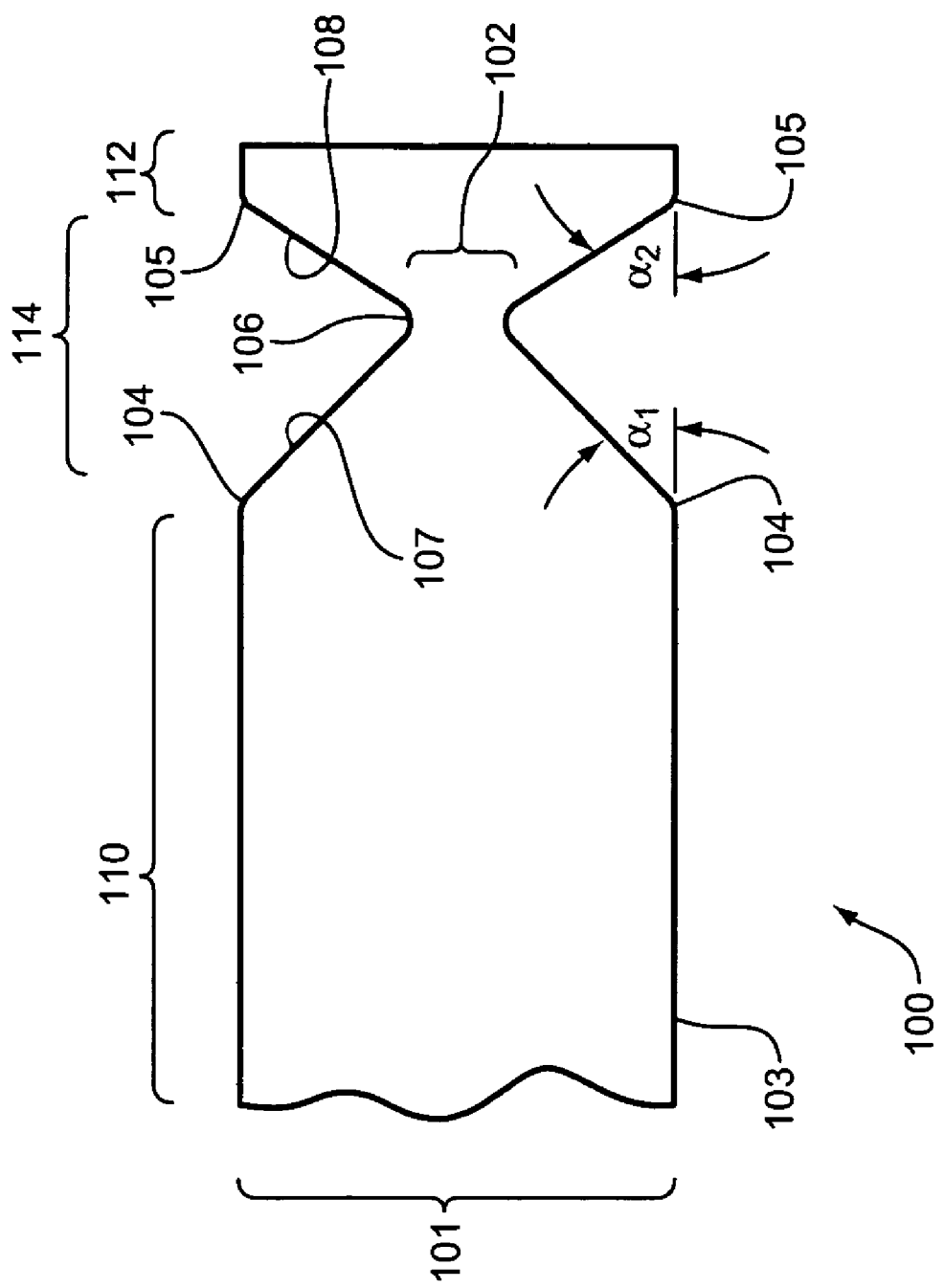
FIG. 1 shows a power shaft according to an embodiment of the invention.

FIG. 1 shows a power shaft 100 according to an embodiment of the invention. The power shaft 100 includes a normal belt position portion 110 of a normal diameter 101 and a reduced diameter portion 114 including a reduced diameter 102. A belt 201 (see FIG. 2) is positioned on and runs on the normal belt position portion 110 during substantially normal operation. The belt 201 can move into the reduced diameter portion 114 of the power shaft 100 during operation and the reduced diameter portion 114 creates an alignment tension force on the belt 201 that operates to return the belt 201 to the normal belt position portion 110 (see FIG. 3 and the accompanying discussion).

If a device driven by the belt 201 should be become slowed or stalled, or if a lubricant is introduced to the belt surface, the belt 201 will try and track to the end of the power shaft 100. Consequently, the belt 201 will move down into the reduced diameter portion 114 and come to rest therein (see FIG. 3). Once the driven device returns to a substantially normal operation, the shaft geometry causes the belt to move back into position on the normal belt position portion 110. The shape and placement of the reduced diameter portion 114 will operate to automatically align and correct any improper placement of the belt 201. In addition, by having the specified geometry machined into the shaft 100, a user cannot incorrectly install the belt 201, preventing damage to the belt 201 and to any adjacent structure.

It should be understood that the power shaft 100 can be a component of any type of power source, such as an electric motor, an internal combustion engine, etc. The power shaft 100 can comprise any drive shaft for transmitting rotational power via the belt 201.

The belt 201 can comprise any type of belt. In one embodiment, the belt 201 is substantially flat (see FIG. 2). Alternatively, the belt 201 can comprise any desired shape, dimension, and cross-section. The belt 201 can be formed of any flexible or semi-flexible material or compound.

The normal belt position portion 110 can comprise a substantially cylindrical shaft portion of the normal diameter 101. The belt 201 runs on the normal belt position portion 110 during normal operation. The normal belt position portion 110 can be of a width to allow some acceptable lateral belt movement/wander during normal operation. The normal belt position portion 110 can include any manner of teeth or splines, roughening or texturing, etc., to improve friction and belt grip between the normal belt position portion 110 and the belt 201.

The reduced diameter portion 114 comprises a first angled portion 107, a neck region 106, and a second angled portion 108. The first angled portion 107 is formed at a first angle $a_1$ from an exterior surface 103 of the shaft 100. The first angled portion 107 angles from the normal diameter 101 of the normal belt position portion 110 inwardly partially toward a center of the shaft 100 and tapers to the reduced diameter 102. In one embodiment, the first angled portion 107 tapers substantially regularly to the reduced diameter 102.

The second angled portion 108 is formed at a second angle $a_2$ from the exterior surface 103. The second angled portion 108 angles outwardly from the reduced diameter 102 of the neck region 106. In the embodiment shown, the second angled portion 108 extends substantially outwardly and extends to the normal diameter 101. However, in other embodiments the second angled portion 108 extends only partially outward (see FIGS. 6 and 7).

The neck region 106 is formed between the first angled portion 107 and the second angled portion 108. The neck region 106 transitions from the first angled portion 107 to the second angled portion 108 (i.e., it transitions from the first angle $a_1$ to the second angle $a_2$). The neck region 106 can comprise a neck radius that transitions substantially smoothly between the first angled portion 107 and the second angled portion 108. The neck radius reduces wear and damage to the edge of the belt 201. The reduced diameter 102 of the neck region 106 can depend on the normal diameter 101, the dimensions of the belt, the makeup and flexibility of the belt, the tension forces on the belt during normal operation and under abnormal loads, etc.

The first angle $a_1$ can comprise any desired angle. The first angle $a_1$ can be chosen according to the dimensions of the belt 201, the makeup and flexibility of the belt 201, the tension forces on the belt 201 during normal operation and under abnormal loads, etc. In one embodiment, the first angle $a_1$ is about 60 degrees. However, it should be understood that other angles can be employed.

The second angle $a_2$ can likewise comprise any desired angle. The second angle $a_2$ can also be chosen according to belt and load factors, and can also be chosen for the ability to return the belt 201 to the normal operating position on the normal belt position portion 110. In one embodiment the second angle $a_2$ is about 65 degrees. However, it should be understood that other angles can be employed.

The reduced diameter portion 114 can include a first radius 104 formed on a first transition region between the normal belt position portion 110 and the first angled portion 107. The first radius 104 forms a substantially smooth transition from the normal belt position portion 110 to the first angled portion 107. The first radius 104 can be included in order to prevent cutting into or abnormally wearing the belt 201 as it passes over (or runs on) the region of the first radius 104. Likewise, the reduced diameter portion 114 can further include a second radius 105 formed on a second transition region between the second angled portion 108 and an end portion 112. The second radius 105 forms a substantially smooth transition from the second angled portion 108 to the end portion 112.

The power shaft 100 can optionally include an end portion 112 of a third diameter, with the third diameter being greater than the reduced diameter 102. In one embodiment (shown), the third diameter is substantially equal to the normal diameter 101. It should be understood that the third diameter can be greater than the normal diameter 101. Alternatively, the shaft 100 can end at the second angled portion 108 (see FIG. 6).

Figure 2:
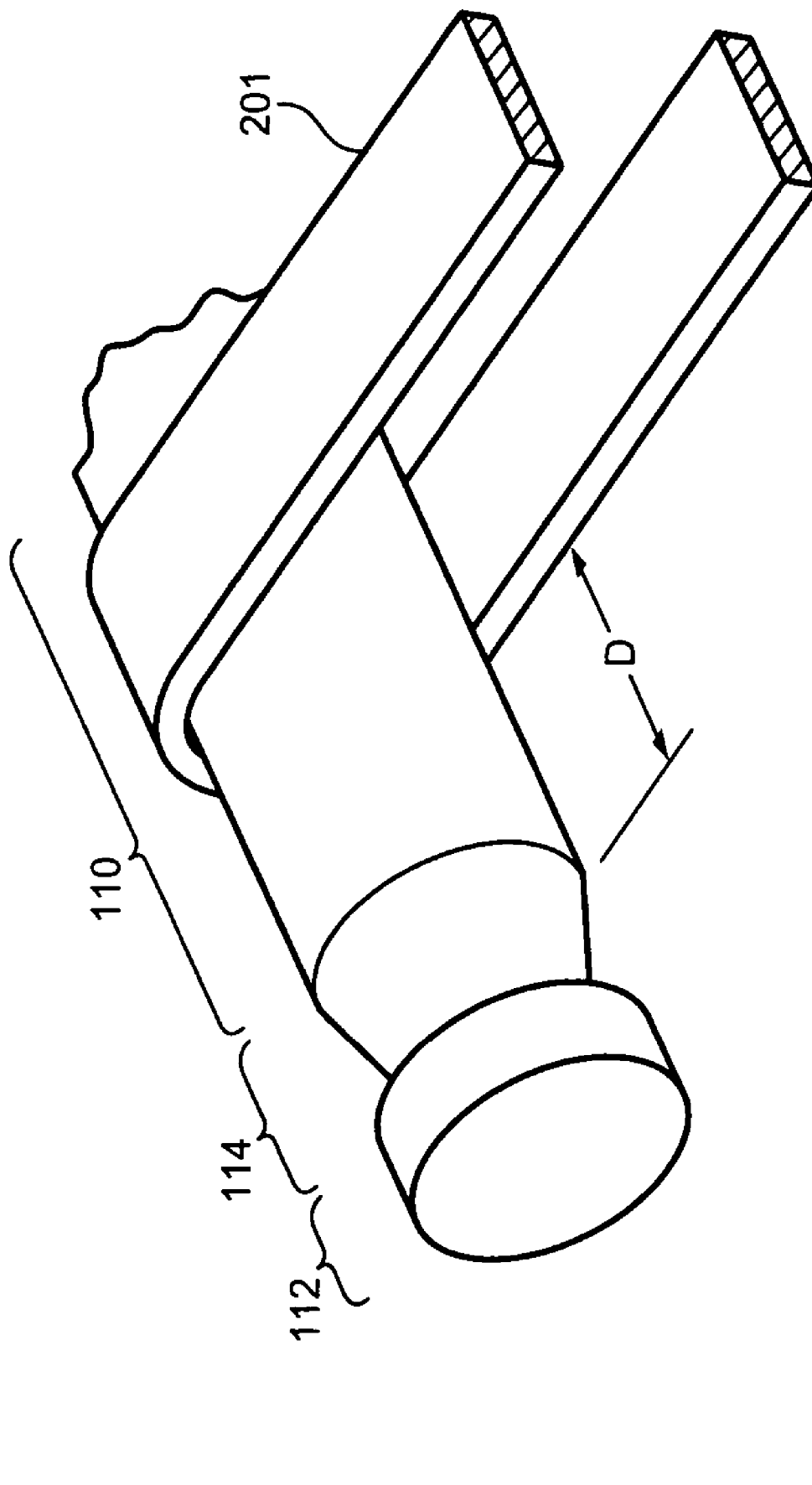
FIG. 2 shows a belt in a typical normal operating position on the normal belt position portion of the power shaft.

FIG. 2 shows a belt 201 in a typical operating position on the normal belt position portion 110 of the power shaft 100. The belt 201 can run at any desired lateral operating distance D from the reduced diameter portion 114. For example, the normal operating distance D of the belt 201 from the reduced diameter portion 114 can be set according to various operating factors, including, for example, the ability of the belt 201 to flex and/or stretch, the anticipated load forces on the belt, the overall width of the belt, the alignment tolerance of the power shaft 100 with respect to the belt 201, etc. It should be understood that the belt 201 can run in a normal operating distance D immediately adjacent to the reduced diameter portion 114 (i.e., D=zero).

Figure 3:
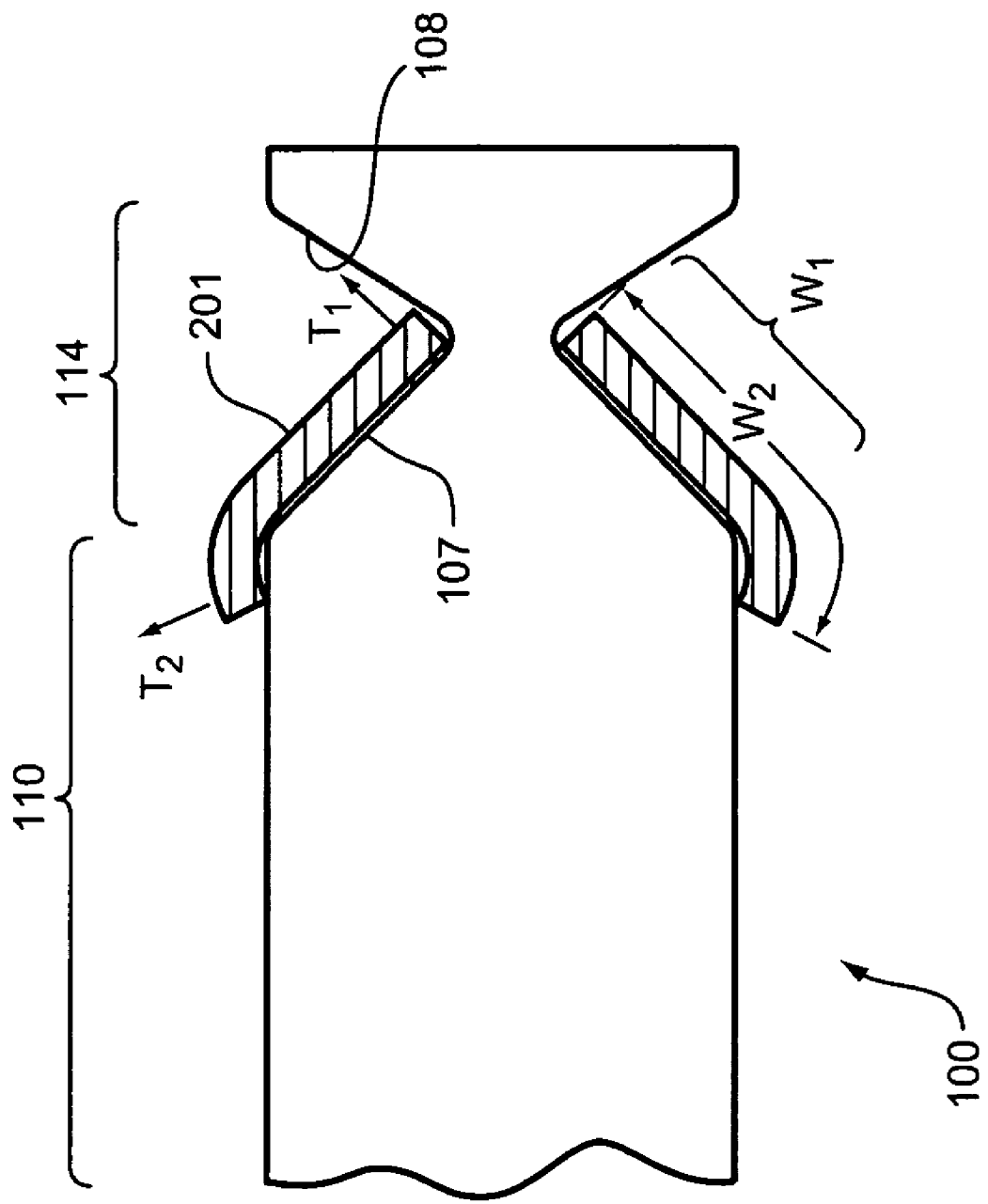
FIG. 3 shows the power shaft wherein the belt is in an offset, excessive load position in a reduced diameter portion of the power shaft.

FIG. 3 shows the power shaft 100 wherein the belt 201 is in an offset, excessive load position in the reduced diameter portion 114 of the power shaft 100. The belt 201 rests on the first angled portion 107, and is prevented from moving off of the shaft 100 by the second angled portion 108. It should be noted that in one embodiment the reduced diameter portion 114 is of a size wherein the belt 201 will not travel fully into the reduced diameter portion 114, i.e., where a first angled portion width $W_1$ is less than the width $W_2$ of the belt 201. It can be seen that a portion of the belt 201 therefore remains on the normal belt position portion 110. As a result, the tension force $T_2$ in this belt portion is greater than the tension $T_1$ in the belt in the portion located in the reduced diameter portion 114. It should be noted that the force vectors $T_2$ and $T_1$ are shown as being perpendicular to the belt 201 for purposes of illustration only, and should be understood to extend lengthwise along the belt 201 in the approximate lateral distribution shown. This unequal tension force on the belt 201 comprises the alignment tension force that causes the belt 201 to return to the normal operating position when possible, such as when the excessive load force is removed. For example, in the case of a vacuum cleaner brushroll stall, when the cause of the stall is removed, the belt 201 will move back to the normal operating position of its own accord, and normal power transmission will resume through the belt 201.

Figure 4:
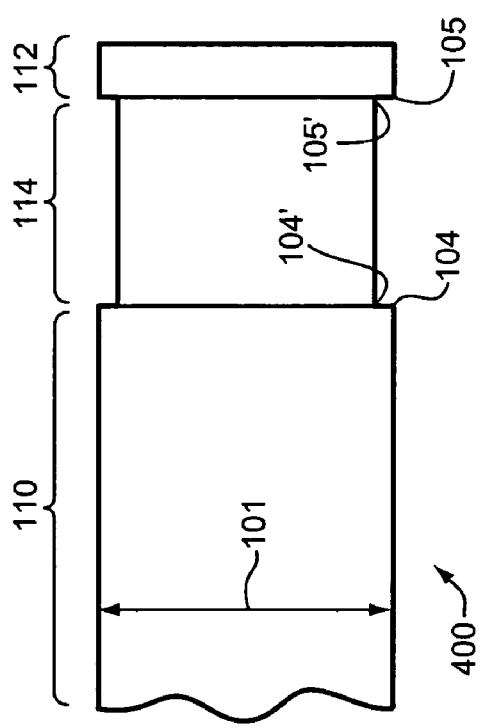
FIG. 4 shows a power shaft according to another embodiment of the invention.

FIG. 4 shows a power shaft 400 according to another embodiment of the invention. In this embodiment, the reduced diameter portion 114 comprises a substantially constant diameter portion that is smaller than the normal diameter 101. As in the previous embodiment, the belt 201 can move laterally on the shaft 100 and into the reduced diameter portion 114 when excessive tension is present on the belt 201. The transition regions 104 and 104' and 105 and 105' can comprise a radius, as previously discussed.

Figure 5:
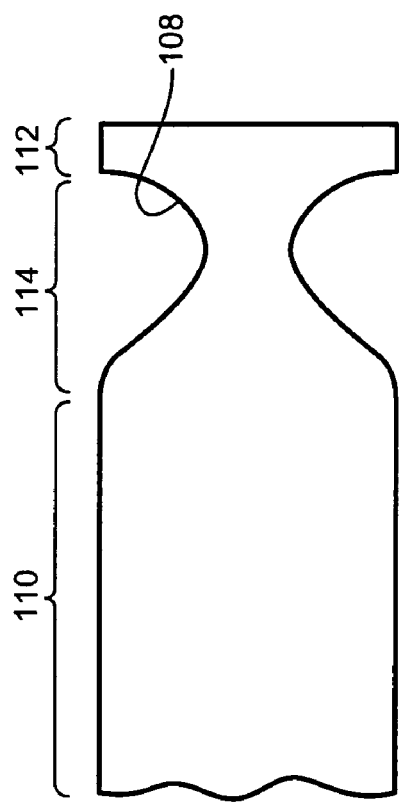
FIG. 5 shows a power shaft according to yet another embodiment of the invention.

FIG. 5 shows a power shaft 500 according to yet another embodiment of the invention. In this embodiment, the second angled portion 108 comprises a curved portion having a substantially constant or varying curvature radius.

Figure 6:
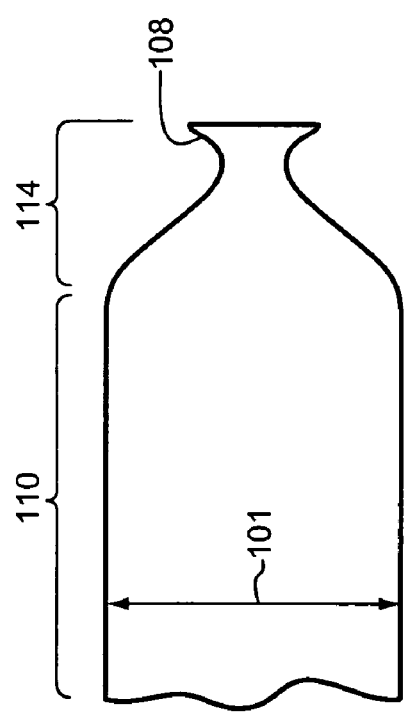
FIG. 6 shows a power shaft according to yet another embodiment of the invention.

FIG. 6 shows a power shaft 600 according to yet another embodiment of the invention. In this embodiment, the second angled portion 108 extends only partially out toward the normal diameter 101. The second angled portion 108 does not extend fully to the normal diameter 101, but still presents a surface that stops the belt 201 from moving off of the shaft 600.

Figure 7:
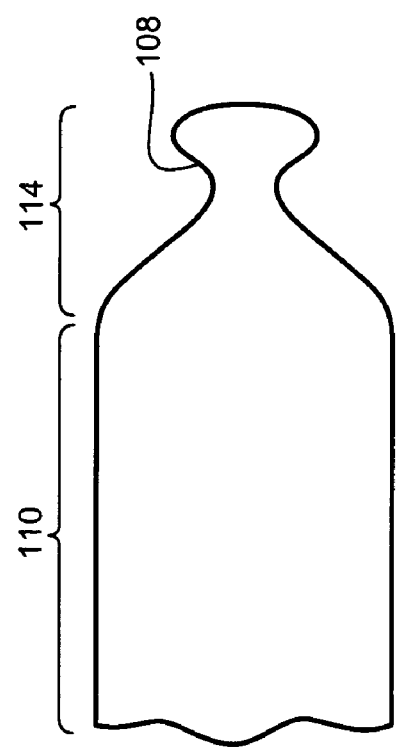
FIG. 7 shows a power shaft according to yet another embodiment of the invention.

FIG. 7 shows a power shaft 700 according to yet another embodiment of the invention. In this embodiment, the second angled portion 108 extends only partially out to the normal diameter 101. The second angled portion 108 can be rounded off, such as in a knob shape, for example.

Figure 8:
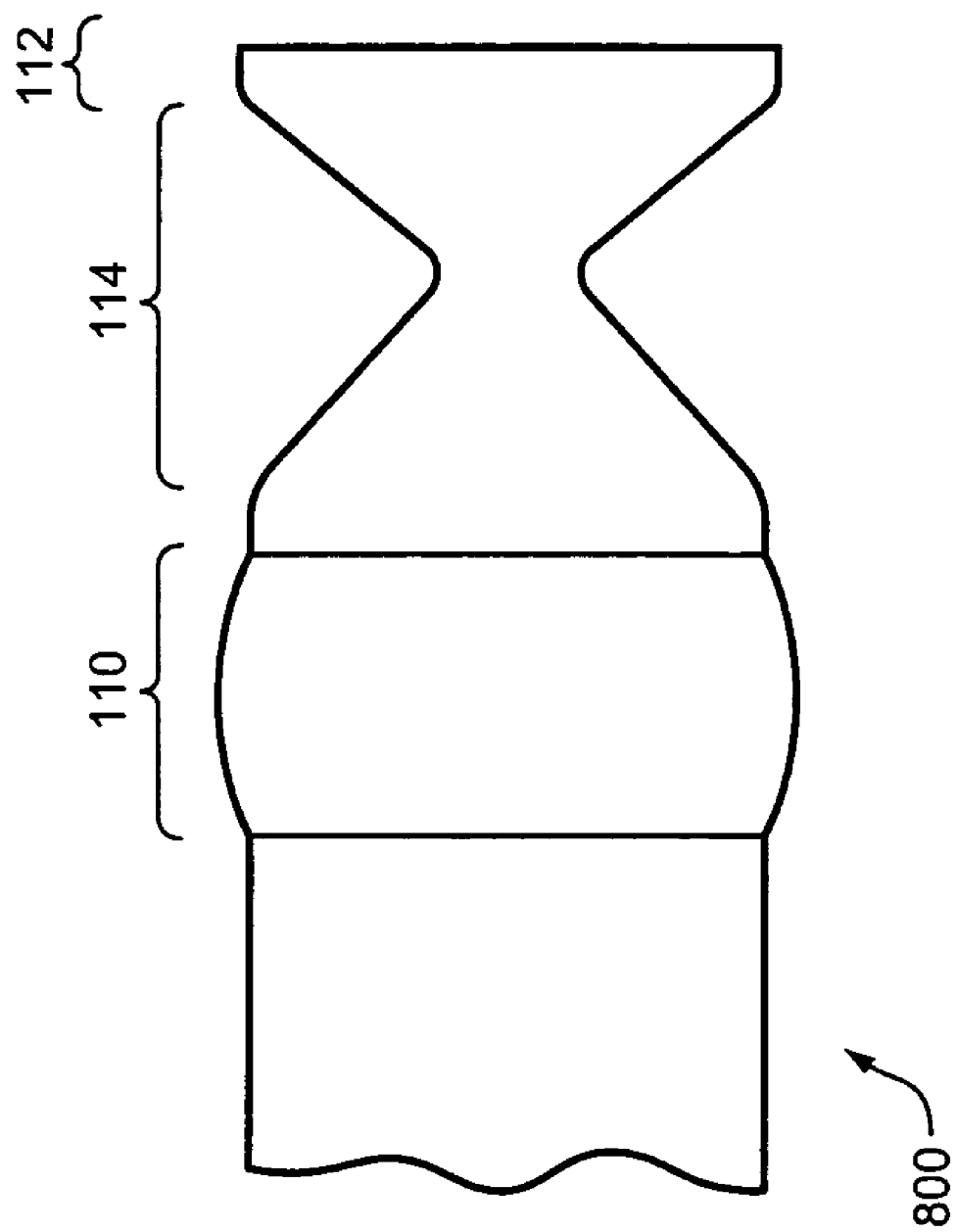
FIG. 8 shows a power shaft according to yet another embodiment of the invention.

FIG. 8 shows a power shaft 800 according to yet another embodiment of the invention. In this embodiment, the normal belt position portion 110 includes a somewhat convex shape, wherein the belt 201 runs on this convex normal belt position portion 110 during normal operation.

It should be understood that the shape of the reduced diameter portion 114 can be varied and still be within the scope of the invention. Several representative shapes of the reduced diameter portion 114 are given. However, other shapes are contemplated and intended to be included in the invention.

The various embodiments of the invention can be implemented to provide several advantages, if desired. The power shaft according to the various embodiments of the invention retains the belt 201 on the shaft 100. The power shaft according to the various embodiments of the invention prevents the belt 201 from moving off of the shaft 100. The power shaft according to the various embodiments of the invention enables the belt 201 to move off of a normal operating position in the presence of a higher than normal load and resulting higher than normal tension force in the belt 201. The power shaft according to the various embodiments of the invention returns the belt 201 to the normal operating position when the higher than normal load is removed. The power shaft geometry causes the belt 201 to seek and return to the normal belt position portion 110 after abnormal operation. The power shaft according to the various embodiments of the invention therefore removes the need for the belt 201 to be correctly and precisely installed.

What is claimed is:

1. A power shaft including a belt retaining geometry, with the power shaft having a shaft including a normal belt position portion adapted for receiving a belt, the power shaft characterized in that the comprises:

a reduced diameter portion formed on the shaft and located adjacent to the normal belt position portion;

wherein the belt can move into the reduced diameter portion of the power shaft during operation and the reduced diameter portion creates an alignment tension force on the belt that operates to return the belt to the normal belt position portion and wherein the diameter of the normal belt position portion is the full diameter portion of the shaft.

2. The power shaft of claim 1, with the reduced diameter portion comprising:

a first angled portion that angles from a normal diameter of the normal belt position portion inwardly partially toward a center of the shaft and tapers to a reduced diameter and at a first angle at from an exterior surface of the shaft;

a second angled portion that angles outwardly from the reduced diameter and at a second angle at from the exterior surface of the shaft; and a neck region formed between the first angled portion and the second angled portion, wherein the neck region transitions from the first angled portion to the second angled portion.

3. The power shaft of claim 2, with the first angled portion tapering substantially regularly to the reduced diameter and at the first angle.

4. The power shaft of claim 2, with the second angled portion extending at least partially to the exterior surface and the normal diameter of the shaft.

5. The power shaft of claim 1, further comprising a first radius formed on a first transition region between the normal belt position portion and the first angled portion, with the first radius forming a substantially smooth transition from the normal belt position portion to the first angled portion.

6. The power shaft of claim 1, with the neck region comprising a neck radius forming a substantially smooth transition from the first angled portion to the second angled portion.

7. The power shaft or claim 1, wherein a first angled portion dimension is less than a belt width of the belt.

8. A power shaft including a belt retaining geometry, with the power shaft having a shaft including a normal belt position portion adapted for receiving a belt, the power shaft characterized in that the shaft comprises:

a first angled portion that angles from a normal diameter of the normal belt position portion inwardly partially toward a center of the shaft and tapers to a reduced diameter and at a first angle from an exterior surface of the shaft;

a second angled portion that angles outwardly from the reduced diameter and at a second angle from the exterior surface of the shaft;

a neck region formed between the first angled portion and the second angled portion, wherein the neck region transitions from the first angled portion to the second angled portion; and the belt positioned on the normal belt position portion of the shaft;

wherein the belt can move into the reduced diameter portion of the power shaft during operation and the reduced diameter portion creates an alignment tension force on the belt that operates to return the belt to the normal belt position portion.

9. The power shaft of claim 8, with the first angled portion tapering substantially regularly to the reduced diameter and at the first angle.

10. The power shaft of claim 8, with the second angled portion extending at least partially to the exterior surface and the normal diameter of the shaft.

11. The power shaft of claim 8, further comprising a first radius formed on a first transition region between the normal belt position portion and the first angled portion, with the first radius forming a substantially smooth transition from the normal belt position portion to the first angled portion.

12. The power shaft of claim 8, with the neck region comprising a neck radius forming a substantially smooth transition from the first angled portion to the second angled portion.

13. The power shaft of claim 8, wherein a first angled portion dimension is less than a belt width of the belt.

14. A method of forming a power shaft including a belt retaining geometry, the method characterized by the steps of:

providing a shaft portion including a normal belt position portion adapted for receiving a belt; and forming a reduced diameter portion on the shaft and located adjacent to the normal belt position portion;

wherein the belt can move into the reduced diameter portion of the power shaft during operation and the reduced diameter portion creates an alignment tension force on the belt that operates to return the belt to the normal belt position portion and wherein the diameter of the normal belt position portion is the full diameter portion of the shaft.

15. The method of claim 14, with forming the reduced diameter portion comprising:

forming a first angled portion that angles from a normal diameter of the normal belt position portion inwardly partially toward a center of the shaft and tapers to a reduced diameter and at a first angle from an exterior surface of the shaft;

forming a second angled portion that angles outwardly from the reduced diameter and at a second angle from the exterior surface of the shaft; and forming a neck region formed between the first angled portion and the second angled portion, wherein the neck region transitions from the first angled portion to the second angled portion.

16. The method of claim 15, with the first angled portion tapering substantially regularly to the reduced diameter and at the first angle.

17. The method of claim 15, with the second angled portion extending at least partially to the exterior surface and the normal diameter of the shaft.

18. The method of claim 14, further comprising forming a first radius on a first transition region between the normal belt position portion and the first angled portion, with the first radius forming a substantially smooth transition from the normal belt position portion to the first angled portion.

19. The method of claim 14, with the neck region comprising a neck radius forming a substantially smooth transition from the first angled portion to the second angled portion.

20. The method of claim 14, wherein a first angled portion dimension is less than a belt width of the belt.

* * * * *

UNITED STATES PATENT AND TRADEMARK OFFICE
CERTIFICATE OF CORRECTION

PATENT NO. : 7,722,491 B2  Page 1 of 1
APPLICATION NO. : 10/716687
DATED : May 25, 2010
INVENTOR(S) : Morgan It is certified that error appears in the above-identified patent and that said Letters Patent is hereby corrected as shown below:

Column 6:
Line 2, before "from" delete "at".
Line 5, before "from" delete "at".

Signed and Sealed this

Seventh Day of September, 2010

David J. Kappos
*Director of the United States Patent and Trademark Office*